United States Patent
Langenstein

[15] 3,693,255
[45] Sept. 26, 1972

[54] LAWN EDGE TRIMMER

[72] Inventor: Julius Langenstein, Max-Eyth-Str. 4, 7918 Illtertissen, Germany

[22] Filed: March 8, 1971

[21] Appl. No.: 122,111

[30] Foreign Application Priority Data

Nov. 26, 1970 Germany .........G 70 43 648.5

[52] U.S. Cl. ................................................30/276
[51] Int. Cl. ............................................B26b 27/00
[58] Field of Search .........30/264, 276, 347; 56/17.1, 56/17.4

[56] References Cited

UNITED STATES PATENTS

| | | | |
|---|---|---|---|
| 2,628,424 | 2/1953 | McMillan | 30/276 |
| 2,832,184 | 4/1958 | Beuerle | 30/276 X |
| 3,050,854 | 8/1962 | Becker | 30/276 |

Primary Examiner—Robert C. Riordon
Assistant Examiner—J. C. Peters
Attorney—Karl F. Ross

[57] ABSTRACT

A lawn edge trimmer has a motor housing with a cutting element rotatably mounted at one end and a grip extending laterally from the other end. A shield is provided adjacent the cutting element. A handle-mounting member is provided between the grip and the shield, engaging in holes into the grip and shield by means of tabs and embracing lugs on the motor housing with claws so that it is securely anchored on the housing. This member is formed with at least two sockets which are inclined to each other and are both adapted to receive the end of an elongated handle to allow different settings of the handle angle. Simple elastic deformation of the shield allows removal of the handle-mounting member.

9 Claims, 4 Drawing Figures

Julius Langenstein
INVENTOR.

BY
Karl F. Ross
Attorney

PATENTED SEP 26 1972

Julius Langenstein
INVENTOR.

BY

Karl F. Ross
Attorney

Julius Langenstein
INVENTOR.

LAWN EDGE TRIMMER

FIELD OF THE INVENTION

The present invention relates to an apparatus for trimming lawn edges and the like. More specifically this invention concerns such a trimmer which can be used with the operator in an erect position.

BACKGROUND OF THE INVENTION

A trimmer is often used to finish up a lawn-mowing job. It is displaced around the very edge of the lawn, around trees and the like, and along driveways and walkways to give a neat overall appearance to the lawn after mowing.

Such an apparatus often has a motor housing with a grip to one side and the cutting element to the other. The grip is held by the user as he passes the apparatus over the area where the vegetation is to be trimmed. The cutting element can be a plastic wire or plurality of such wire which are held at one end on a spool and spun at high speed so that, although they stand out from their hub rigidly due to centrifugal force, they are not likely to do serious damage to a tree or the operator's hand. A shield is also secured to the housing just adjacent the orbit of the cutting element to further protect the operator, and to prevent cuttings from flying in every direction and into the motor's air intake. A major drawback to such a trimmer is that it requires the operator to work on the his knees, or at best in a stooped position.

It has therefore been suggested to provide an arrangement comprising at least one roller carried on the end of a handle which is also provided with a clamp that grip the motor housing. Although such a setup does allow the trimmer to be used by an erect person, it makes servicing of the device tricky, and is difficult to remove should the trimmer be needed for hand-held operation, e.g. trimming a hedge.

OBJECTS OF THE INVENTION

It is therefore an object of the present invention to provide an improved trimmer.

Another object is the provision of an edge trimmer which can be used by an erect operator.

SUMMARY OF THE INVENTION

The above objects are obtained according to the present invention by a trimming apparatus of the above-described general type wherein a handle-mounting member formed with at least one socket is removably received between the grip and the shield. This member engages via pins or lugs in bores formed in the grip and shield, and is provided at the upper and lower limits of its edge turned toward the motor housing with small claws which embrace formations on this housing and prevent rotation of the member relative to the housing.

According to another feature of this invention the shield is resiliently deformable so that attachment of the handle-mounting member is made by simply forcing the shield back as the two pins or lugs are pressed home. As soon as the pins engage in their respective holes the shield goes back into place to effectively block the member in place. Bending the shield away from the grip allows the member to be removed easily.

In accordance with yet another feature of the present invention the handle-mounting member is generally planar and formed with a pair of sockets which lie in a common plane with the central axis of the trimmer but extend at an angle to each other. This allows the user to choose the handle height most comfortable to him. Of course, three or more such sockets can be provided.

This trimmer is easy to use in the extreme. Since the handle-mounting member and handle have a very nominal weight, the trimmer does not need guiding rollers. The overall weight remains small so that trimming the edge of a lawn or the like becomes a very simple job.

DESCRIPTION OF THE DRAWING

The above and other objects, features and advantages will become apparent from the following description, reference being made to the accompanying drawing, in which.

SPECIFIC DESCRIPTION

Figure 1:
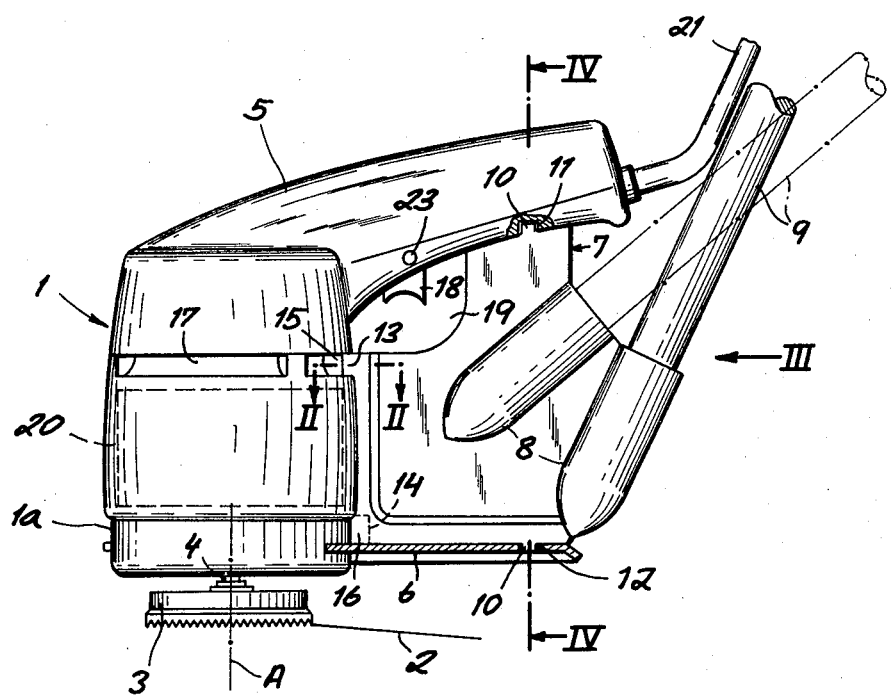
FIG. 1 is a side view partly broken away of the trimmer according to the present invention.

As seen in the figures, the trimmer according to the present invention has a motor housing 1 in which a motor 20 is received. This motor 20 has a shaft 4 on which is mounted a hub or spool 3 from which extends the end of a synthetic-resin wire 2 which is spun about the motor axis A and acts as a cutting element.

At the other side of the housing 1 a grip 5 is provided which extends laterally from the housing and is adapted to be held by the user's hand when he does not choose to use the auxiliary handle according to the present invention. An electric cord 21 extends from the end of the grip 5 and a trigger 18 is provided on the underside of the grip to turn the motor 20 on and off.

Figure 4:
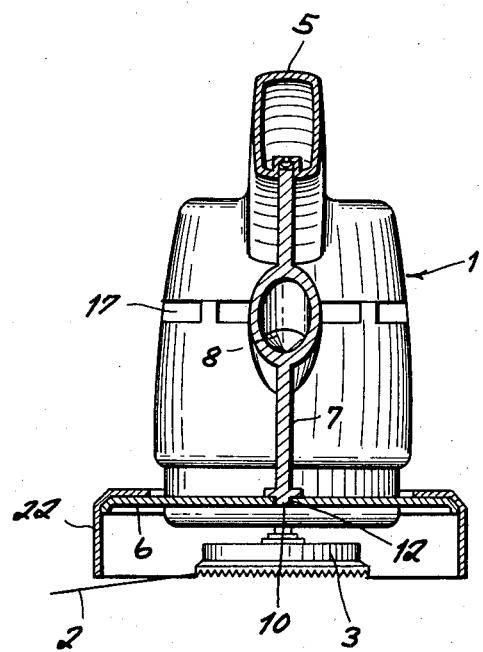
FIG. 4 is a section taken along line IV—IV of FIG. 1.

Secured to the housing 1 just above the cutting element 2 is a shield 6 which is in the form of a plate with downturned edges that extends out over the entire orbit of the element 2 or at least the part directly below the handle. An annular skirt 22 (FIG. 4) can be fitted over the shield 6 to extend axially down around the cutting wire 2 so as to prevent clippings from flying out in every direction, particularly into the air intake 17 of the motor 20.

Figure 2:
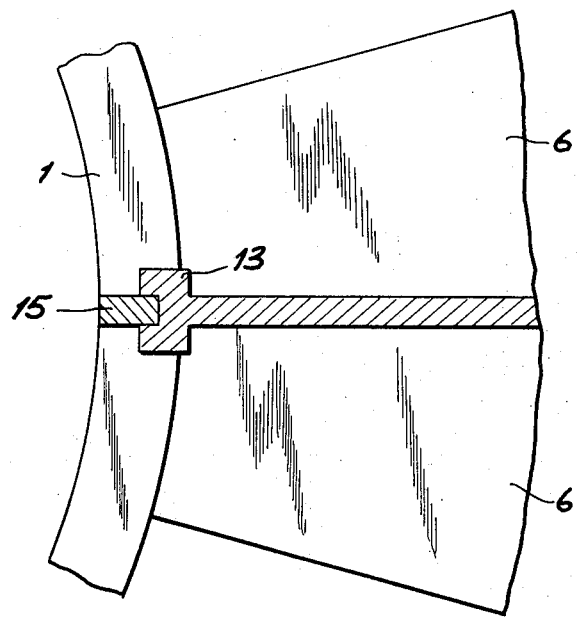
FIG. 2 is a section taken along line II—II of FIG. 1, in enlarged scale.
Figure 3:
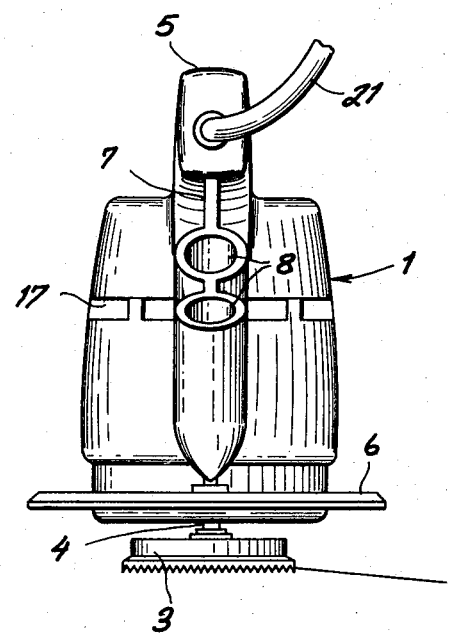
FIG. 3 is a view taken in the direction of arrow III of FIG. 1.

A handle mounting member 7 is provided with a pair of in-line projecting lugs 10. The upper lug 10 engages in a blind bore !1 in the grip 5 formed by the counterbore for a screw that holds together the two halves of this grip. The other lug 10 is received in a hole 12 in the shield 6. The edge of the member 7 which is turned toward the housing 1 is provided at its upper extend with a claw 13 and at its lower region with a claw 16. FIG. 2 shows how the upper claw 13 embraces a strut 15 which extends across the air-intake opening 17 for the motor. The claw 16 similarly embraces a tab 14 on the lower end of this housing 1. Thus, the two claws 13 and 16 are axially spaced apart as much as possible.

In this manner the member 7 is fixed relative to the trimmer. It bears on the trimmer at four spaced-apart locations so that canting or twisting is impossible.

The handle-mounting plate 7 is formed with a pair of elongated cylindrical sockets 8 which lie in the plane of the plate and are angularly offset from each other. A synthetic-resin handle 9 of rod shape can be fitted into either of these sockets. The trimmer is advantageously held with the shield at an angle of 20° to 30° to the horizontal in use. The upper socket 8 extends at an angle of between 30° and 45° to the plane of the shield (here 38°) and the lower socket at an angle between 60° and 70° (preferably 65°) to the shield plane. In this manner a short operator would use the upper socket, and a taller operator would use the lower one. If only one such socket 8 is provided, it advantageously extends at an angle of around 45° to the shield 6. The wand or handle 9 can be either straight or crooked, depending on how it is to the gripped.

The plate 7 conforms to the space between the grip 5 and the shield 6 closely except for a cutout 19 adjacent the trigger 18. This cutout 19 allows unhindered operation of the trigger, which advantageously is provided with a locking device 23.

The trimmer according to the present invention can be one of several uses to which the motor unit is put. To this end the lower end 1a of the housing 1 can be separable from the rest of the housing along with the shield 6 and hub 3 so that the motor 20 can be used on a hand drill, sander, or other powered hand tool by mounting different attachments on the housing end. In any case the handle-mounting member 7 is easily removable so that the trimmer can be used without it to trim a hedge, for instance, and then quickly provided with a handle for trimming the edge of a lawn.

I claim:
1. An apparatus for trimming vegetation comprising: a housing having a pair of opposite sides;
a motor in said housing;
a rotatable cutting element at one side of said housing and connected to said motor;
a grip extending laterally from said housing at the other side;
a shield attached to said housing adjacent said cutting element and spaced from said grip; and
a handle-mounting member between said grip and said shield and bearing on said grip and to said shield, said member being formed with at least one socket adapted to receive an end of an elongated handle.
2. The apparatus defined in claim 1 wherein said shield is a generally planar disk extending laterally outwardly from said housing adjacent said element.
3. The apparatus defined in claim 2 wherein said member is generally planar and is provided with projections engaging said grip and shield.
4. The apparatus defined in claim 3 wherein said grip and said shield are each formed with a hole receiving a respective one of said projections.
5. The apparatus defined in claim 4 wherein said member is provided with at least one claw engaging said housing.
6. The apparatus defined in claim 5 wherein said member is formed with two such claws spaced from each other and both engaging said housing.
7. The apparatus defined in claim 3 wherein said member is formed with at least two such sockets lying in the plane of said member and angularly offset to each other.
8. The apparatus defined in claim 1 wherein said grip is provided with a trigger operable to actuate said motor, said member conforming to the space between said grip and said shield and formed with a cutout around said trigger.
9. The apparatus defined in claim 1 wherein said shield is a deformable generally planar plate extending from said housing below said grip, said member being generally planar and being formed with a pair of projections, said grip and said shield each being formed with a hole receiving respective projections, said member having an edge turned toward said housing formed with a pair of claws, said housing having formations engaged by said claws, said grip having a trigger, said member closely conforming to the space between said grip and said shield and being formed with a cutout around said trigger, sad member being formed with at least two such sockets lying in the plane of said member and being angularly offset to each other, said cutting element being a synthetic-resin wire.

* * * * *